Patented Feb. 11, 1930

1,746,652

UNITED STATES PATENT OFFICE

HANS HEYNA, OF HOCHST-ON-THE-MAIN, WERNER KIRST, OF FRANKFORT-ON-THE-MAIN, AND HERBERT KRACKER AND KARL MOLDAENKE, OF HOCHST-ON-THE-MAIN, GERMANY, ASSIGNORS TO GENERAL ANILINE WORKS, INC., OF NEW YORK, N. Y., A CORPORATION OF DELAWARE

AZO DYESTUFFS AND PROCESS OF MAKING THEM

No Drawing. Application filed March 13, 1928, Serial No. 261,408, and in Germany March 21, 1927.

Our present invention relates to azo dyestuffs and process of making them.

We have found that azo-dyestuffs can be obtained by coupling a diazo-compound of a dihalogen substitution product of meta-toluidine with a compound capable of being taken up by vegetable fiber and capable of being coupled, for instance, an arylamide of 2.3-hydroxynaphthoic acid.

The dyestuffs may be made in substance or in presence of a suitable substratum, or they may be produced directly on the fiber. The dyeings obtainable with the dyestuffs are distinguished by their fastness to kier-boiling and to chlorine, and in particular by their excellent fastness to light.

The following examples illustrate the invention:

4.5 grams of 2.3-hydroxynaphthoic acid-4-chloro-2-anisidide,
9 cc. of sodium Turkey red oil of 50 per cent strength, and
11.25 cc. of caustic soda solution of 34° Bé. are dissolved in hot water and cooled to about 50° C., there are added
4.5 cc. of formaldehyde of 30 per cent strength, and the whole is made up to 1 liter

Developing bath 3.52 grams of 1-amino-2.4-dichloro-3-methylbenzene are made into a paste with a small quantity of water and
5.2 cc. of hydrochloric acid of 22°Bé.; to this paste there are added by portions ice and
1.44 grams of sodium nitrite in the form of a solution. When the diazotization is complete, the mass is neutralized by means of
4 grams of sodium acetate and the whole is made up with water to 1 liter 50 grams of well boiled cotton yarn are treated with the grounding solution for half an hour, well freed from water by wringing out and centrifuging and dyed in the diazo-solution for 1 minute. After the material has been thoroughly rinsed, the dyeing is soaped at boiling temperature and rinsed.

The dyeing produced is vivid scarlet and is fast to kier-boiling, chlorine and light.

The dyestuff has probably the following formula:

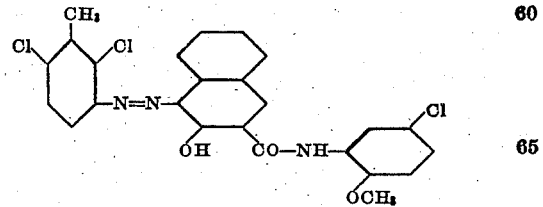

(2) Grounding liquor 2.5 grams of 2.3-hydroxynaphthoic acid-2-naphthalide
5 cc. of sodium Turkey red oil of 50 per cent strength, and
7.5 cc. of caustic soda solution of 34° Bé. are dissolved with the aid of hot water. After cooling there are added
2.5 cc. of formaldehyde and the whole is made up with water to 1 liter

Developing bath 3.52 grams of 1-amino-4.6-dichloro-3-methylbenzene are made into a paste with
5.2 cc. of hydrochloric acid of 22° Bé. and a small quantity of water and to this paste are gradually added a solution of
1.44 grams of sodium nitrite together with some ice. When diazotization is complete, the whole is neutralized by means of
4 grams of sodium acetate and made up with water to 1 liter The material is dyed in the manner described in Example (1); the dyeing is vivid red fast to kier-boiling and to light.

The dyestuff has probably the following formula:

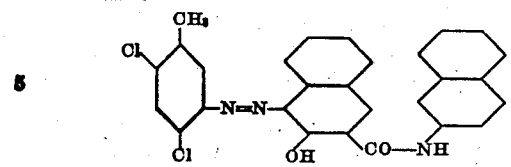

(3) Grounding liquor

| 4.5 grams | of 2.3-hydroxynaphthoic acid-2.5-dimethoxy-1-anilide, |
| --- | --- |
| 9 cc. | of sodium Turkey red oil of 50 per cent strength, and |
| 11.25 cc. | of caustic soda solution of 34° Bé. are dissolved with aid of boiling water and after cooling there are added |
| 4.5 cc. | of formaldehyde of 30 per cent strength and the whole is made up with water to |
| 1 liter | |

Developing bath

| 3.52 grams | of 1-amino-4.6-dichloro-3-methylbenzene are made into a paste with |
| --- | --- |
| 5.2 cc. | of hydrochloric acid of 22° Bé. and a small quantity of water and to the paste so obtained are gradually added a solution of |
| 1.44 grams | of sodium nitrite together with some ice. When diazotization is complete, the mass is neutralized with |
| 4 grams | of sodium acetate and made up with water to |
| 1 liter | |

The material is dyed in the manner described in Example (1), whereby there is obtained a medium red dyeing of good fastness to kier-boiling and excellent fastness to light.

If instead of the grounding liquor described in this example there is used a grounding liquor prepared from 2.3-hydroxynaphthoic acid-4-anisidide, there is obtained a red of excellent fastness to light.

The dyestuff has probably the following formula:

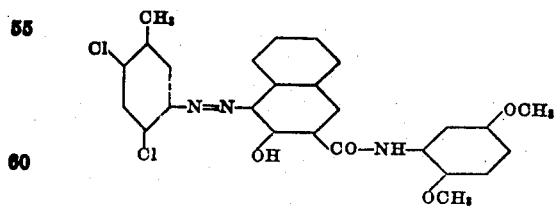

(4) Grounding liquor

| 4 grams | of 2.3-hydroxynaphthoic acid-5-chloro-2-anisidide, |
| --- | --- |
| 8 cc. | of sodium Turkey red oil of 50 per cent strength |
| 10 cc. | of caustic soda solution of 34° Bé. are dissolved with the aid of boiling water. After cooling there are added |
| 4 cc. | of formaldehyde of 30 per cent strength and the mass is made up with water to |
| 1 liter | |

Developing bath

| 3.52 grams | of 1-amino-4.5-dichloro-3-methylbenzene are made into a paste with |
| --- | --- |
| 5.2 cc. | of hydrochloric acid of 22° Bé. and a small quantity of water and to this paste are gradually added a small quantity of ice and a solution of |
| 1.44 grams | of sodium nitrite. When diazotization is complete, the mass is neutralized with |
| 4 grams | of sodium acetate and made up to |
| 1 liter | |

The material is dyed in the manner described in Example (1), whereby there is obtained a vivid yellowish scarlet fast to kier-boiling, chlorine and light.

The dyestuff has probably the following formula:

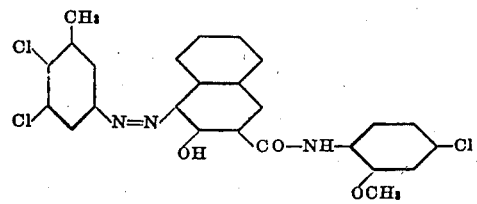

(5) Grounding liquor

| 4.5 grams | of 2.3-hydroxynaphthoic acid-2.5-dimethoxy-1-anilide, |
| --- | --- |
| 9 cc. | of sodium Turkey red oil of 50 per cent strength, and |
| 11.25 cc. | of caustic soda solution of 34° Bé. are dissolved with the aid of boiling water, and after cooling there are added |
| 4.5 cc. | of formaldehyde of 30 per cent strength and the whole is made up to |
| 1 liter | |

Developing bath

| 3.52 grams | of 1-amino-2.5-dichloro-3-methylbenzene are made into a paste with |

5.2 cc. of hydrochloric acid of 22° Bé. and a small quantity of water and to this paste there are added a small quantity of ice and a solution of
1.44 grams of sodium nitrite. When diazotization is complete there are added about
4 grams of sodium acetate until the solution shows a neutral reaction towards Congo paper and the whole is then made up to 1 liter The dyeing obtained by dyeing material in the manner described in Example (1) is a brownish-orange fast to light and of moderately good fastness to kier-boiling.

The dyestuff has probably the following formula:

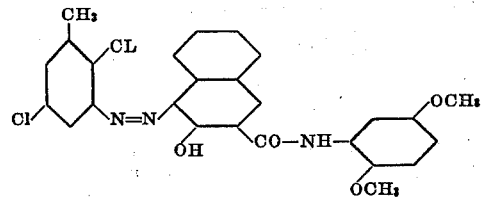

(6) *Grounding liquor*

4.5 grams of 2.3-hydroxynaphthoic acid-5-chloro-2-toluidide are dissolved in water at boiling temperature together with
9 cc. of sodium Turkey red oil of 50 per cent strength and
9 cc. of caustic soda solution of 34° Bé.; the whole is cooled and there are then added
4.55 cc. of formaldehyde. The solution is made up to 1 liter

*Developing bath*

5.3 grams of 1-amino-4.5-dibromo-3-methylbenzene are made into a paste with
5.2 cc. of hydrochloric acid of 22° Bé. and a small quantity of water and to this paste are added some ice and a solution of
1.44 grams of sodium nitrite. After diazotization is complete sodium acetate is added until the mass shows a neutral reaction towards Congo paper and the whole is then made up to 1 liter The dyeing obtained by dyeing the material in the manner described in Example (1) is a vivid scarlet fast to kier-boiling and of good fastness to light.

The dyestuff has probably the following formula:

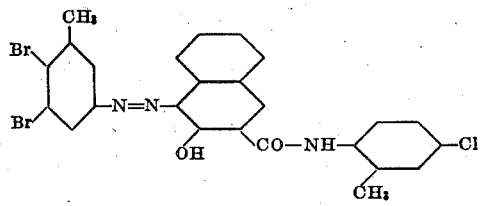

(7) *Grounding liquor*

4.5 grams of 2.3-hydroxynaphthoic acid-1-naphthalide,
9 cc. of sodium Turkey red oil of 50 per cent strength and
11.25 cc. of caustic soda solution of 34° Bé. are dissolved with the aid of boiling water, and after cooling there are added
4.5 cc. of formaldehyde of 30 per cent strength. The solution is then made up to 1 liter

*Developing bath*

5.3 grams of 1-amino-4.6-dibromo-3-methylbenzene are made into a paste with
5.2 cc. of hydrochloric acid of 22° Bé. and a small quantity of water and to this paste there are added a small quantity of ice and a solution of
1.44 grams of sodium nitrite. When diazotization is complete there are added about
4 grams of sodium acetate until the mass shows a neutral reaction towards Congo paper. The whole is then made up to 1 liter By dyeing the material in the manner described in Example (1), there is obtained a bluish-red of good fastness to light and moderately good fastness to kier-boiling.

The dyestuff has probably the following formula:

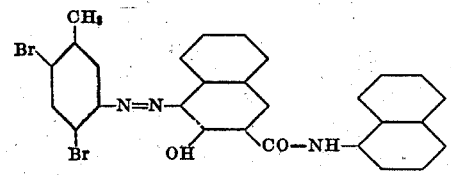

We claim:
1. As new products, the azo dyestuffs of the following general formula:

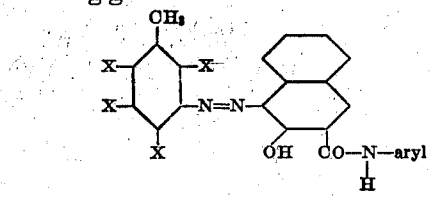

wherein two X stand for halogen atoms, the other X stand for hydrogen atoms and aryl stands for an aryl group free from SO$_2$OH or COOH groups, being yellow to brown powders and yielding when produced on the fiber yellow to brown and yellow to bluish-red dyeings of excellent fastness properties.

2. As new products, the azo dyestuffs of the following formula:

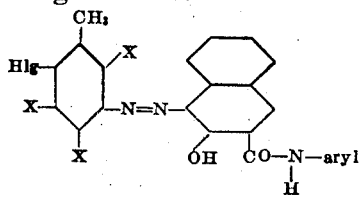

wherein Hlg stands for a halogen atom, one X likewise for a halogen atom, the other X stand for hydrogen atoms and aryl stands for an aryl group free from SO$_2$OH or COOH groups, being yellow to brown powders and yielding when produced on the fiber yellow to brown and yellow to bluish-red dyeings of excellent fastness properties.

3. As new products, the azo dyestuffs of the following formula:

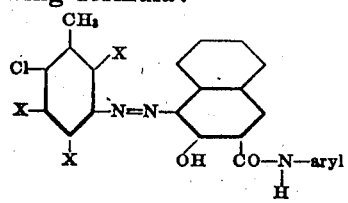

wherein one X stands for a halogen atom, the other X stand for hydrogen atoms and the aryl stands for an aryl group free from SO$_2$OH or COOH groups, being yellow to brown powders and yielding when produced on the fiber yellow to brown and yellow to bluish-red dyeings of excellent fastness properties.

4. As new products, the azo dyestuffs of the following formula:

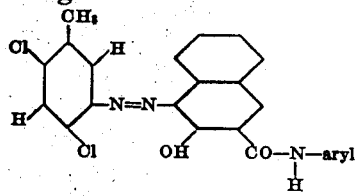

wherein the aryl stands for an aryl group free from SO$_2$OH or COOH groups, being yellow to brown powders and yielding when produced on the fiber yellow to brown and yellow to bluish-red dyeings of excellent fastness properties.

5. As a new product, the azo dyestuff of the following formula:

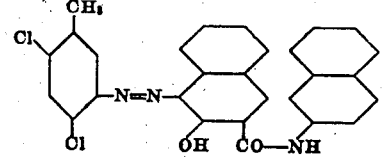

being a red powder and yielding when produced on the fiber a vivid red dyeing of good fastness to kier-boiling and to light.

In testimony whereof, we affix our signatures.

HANS HEYNA.
WERNER KIRST.
HERBERT KRACKER.
KARL MOLDAENKE.